United States Patent
Kawai et al.

(10) Patent No.: US 10,044,903 B2
(45) Date of Patent: Aug. 7, 2018

(54) INFORMATION PROCESSING APPARATUS AND CONTROL METHOD FOR SWITCHING A COMMUNICATION DESTINATION WHILE REDUCING PROCESSING LOAD WHEN ESTABLISHING A CONNECTION

(71) Applicant: CANON KABUSHIKI KAISHA, Tokyo (JP)

(72) Inventors: Ryoya Kawai, Kawasaki (JP); Mitsuru Konji, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/335,959

(22) Filed: Oct. 27, 2016

(65) Prior Publication Data

US 2017/0126928 A1 May 4, 2017

(30) Foreign Application Priority Data

Oct. 30, 2015 (JP) .................................. 2015-214961

(51) Int. Cl.
| | |
|---|---|
| *H04N 1/327* | (2006.01) |
| *H04N 1/00* | (2006.01) |
| *H04W 84/04* | (2009.01) |
| *H04W 84/12* | (2009.01) |
| *H04W 88/06* | (2009.01) |

(52) U.S. Cl.
CPC ..... *H04N 1/32797* (2013.01); *H04N 1/00307* (2013.01); *H04W 84/042* (2013.01); *H04W 84/12* (2013.01); *H04N 2201/006* (2013.01); *H04N 2201/0055* (2013.01); *H04N 2201/0094* (2013.01); *H04W 88/06* (2013.01)

(58) Field of Classification Search
USPC ................................ 358/1.1–3.23, 1.11–1.18
See application file for complete search history.

(56) References Cited

U.S. PATENT DOCUMENTS

| | | | |
|---|---|---|---|
| 8,023,494 B2 * | 9/2011 | Takeda ................ | H04L 12/5692 370/350 |
| 9,313,363 B2 * | 4/2016 | Maeda ............... | H04N 1/32539 |
| 9,483,223 B2 * | 11/2016 | Park ...................... | G06F 3/1296 |
| 2012/0184328 A1 * | 7/2012 | Komaki ................ | H04W 76/23 455/552.1 |
| 2014/0240776 A1 * | 8/2014 | Suzuki .................. | G06F 3/1296 358/1.15 |
| 2014/0268222 A1 * | 9/2014 | Inoue .................... | G06F 3/1221 358/1.15 |
| 2015/0009532 A1 * | 1/2015 | Tsugimura ............ | G06F 3/1292 358/1.15 |
| 2017/0019637 A1 * | 1/2017 | Nagase ............... | H04L 65/1069 |

FOREIGN PATENT DOCUMENTS

JP          2014-207650 A          10/2014

* cited by examiner

*Primary Examiner* — Marcellus Augustin
(74) *Attorney, Agent, or Firm* — Canon USA, Inc. I.P. Division

(57) ABSTRACT

A control method including switching, in accordance with receipt of a print instruction, from a first state to a second state in which communication with an external apparatus based on a second communication method is possible and communication with the Internet based on a first communication method is not performed, while connection to the Internet based on the first communication method and connection to the external apparatus based on the second communication method are established and maintained in parallel.

20 Claims, 8 Drawing Sheets

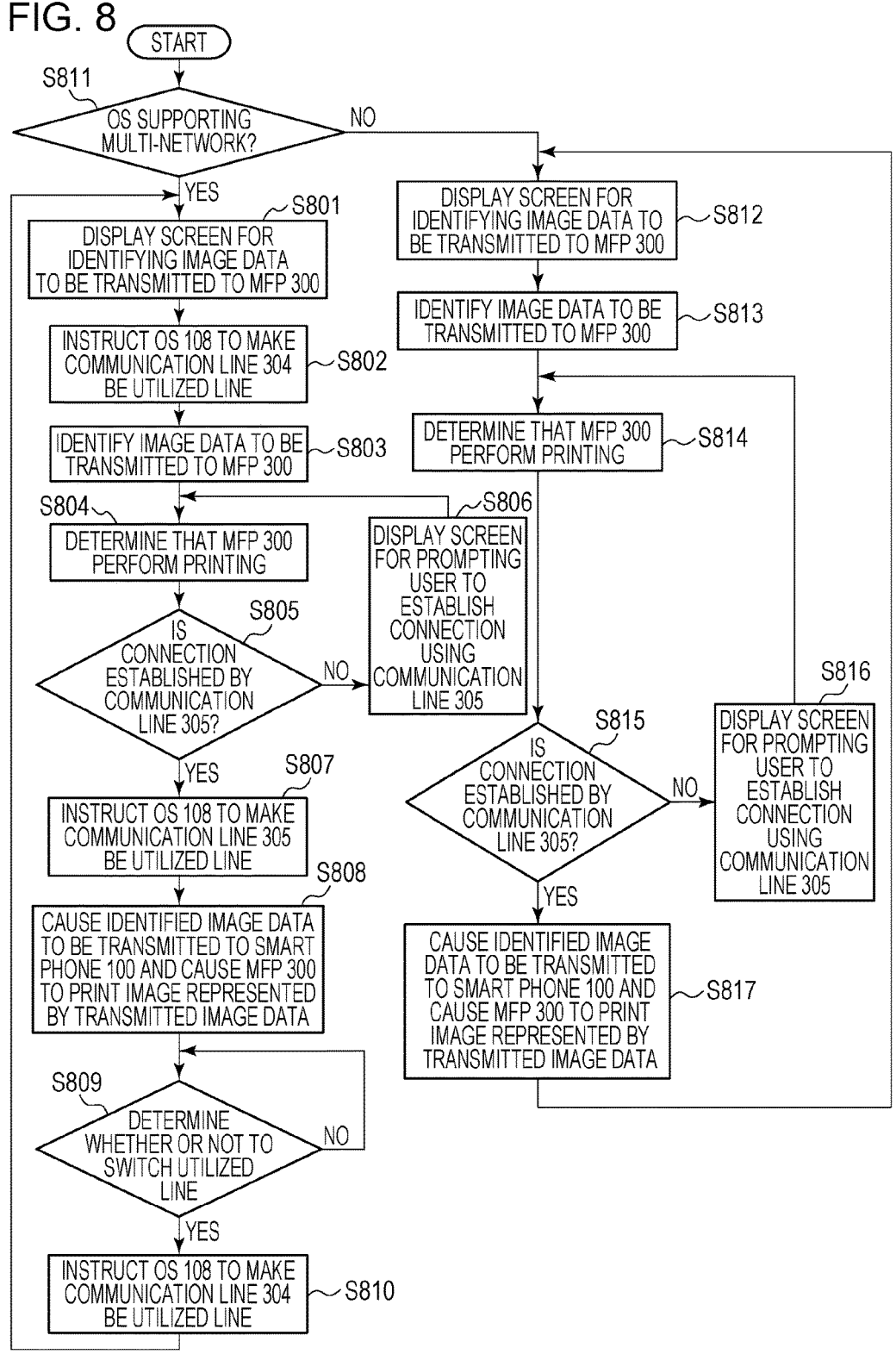

INFORMATION PROCESSING APPARATUS AND CONTROL METHOD FOR SWITCHING A COMMUNICATION DESTINATION WHILE REDUCING PROCESSING LOAD WHEN ESTABLISHING A CONNECTION

BACKGROUND OF THE INVENTION

Field of the Invention

The present invention relates to an information processing apparatus and a control method.

Description of the Related Art

An information processing apparatus is known in which connection to an external apparatus and the Internet is established and communication is performed. In such an information processing apparatus, a communication destination needs to be changed in accordance with situations.

Japanese Patent Laid-Open No. 2014-207650 proposes a technology in which, when a predetermined application is activated, a connection to the Internet is cut and a connection to an external apparatus is established, and when communication with the external apparatus has terminated, the connection to the external apparatus is cut and a connection to the Internet is established.

However, in order to switch a communication destination by cutting/establishing a connection, the information processing apparatus needs to store information about connection setting content and register the set information. Hence, in Japanese Patent Laid-Open No. 2014-207650, there is an issue in that a load for performing the processing described above is generated every time a predetermined application is activated or communication with the external apparatus has terminated.

The present disclosure has been completed in view of the issues described above, and a communication destination is switched while reducing a load regarding processing for cutting/establishing a connection.

SUMMARY OF THE INVENTION

A control method of the present invention for solving the issues described above is a control method for an information processing apparatus including: receiving a selection of data to be transmitted to an external apparatus, in a first state in which communication with the Internet based on a first communication method is possible and communication with the external apparatus based on a second communication method is not performed; receiving a print instruction for making the external apparatus perform printing on a basis of the selected data; switching, in accordance with receipt of the print instruction, from the first state to a second state in which communication with the external apparatus based on the second communication method is possible and communication with the Internet based on the first communication method is not performed, while connection to the Internet based on the first communication method and connection to the external apparatus based on the second communication method are maintained established in parallel; and transmitting the selected data to the external apparatus, when switched to the second state.

Further features of the present invention will become apparent from the following description of exemplary embodiments with reference to the attached drawings.

BRIEF DESCRIPTION OF THE DRAWINGS

FIG. 8 is a flowchart illustrating processing performed by an application in the present embodiment.

DESCRIPTION OF THE EMBODIMENTS

Hereinafter, preferred embodiments will be illustratively described with reference to the drawings. It should be understood that regarding the present disclosure, embodiments realized by appropriately applying modifications or improvements within the scope of the present disclosure to the embodiments described below on the basis of usual knowledge of those skilled in the art are within the scope of the present disclosure.

First Embodiment

An information processing apparatus to which the present disclosure is applied will be described. Note that a smart phone will be illustrated as the information processing apparatus in the present embodiment. However, an apparatus that can be used as the information processing apparatus is not limited this, and may be any apparatus that can perform communication using a plurality of communication lines. In other words the information apparatus may be a mobile terminal, a notebook PC, a tablet terminal, a personal digital assistant (PDA), a digital camera, or the like. In the present embodiment, an inkjet-type multifunction peripheral (MFP) is illustrated as an external apparatus. Note that an apparatus that can be used as the external apparatus is not limited to this, and may be any apparatus that can communicate with the information processing apparatus. In other words, the external apparatus may be a full-color printer, a monochrome printer, a copy machine, a facsimile machine, a scanner, a portable terminal, a notebook PC, a tablet terminal, a PDA, a digital camera, or the like. Further, the external apparatus may be a single-function peripheral (SFP) rather than an MFP. Further, when the external apparatus has a printer function, the recording method of the external apparatus is not limited to an inkjet method and may be another recording method, such as an electrophotographic method.

Figure 1A:
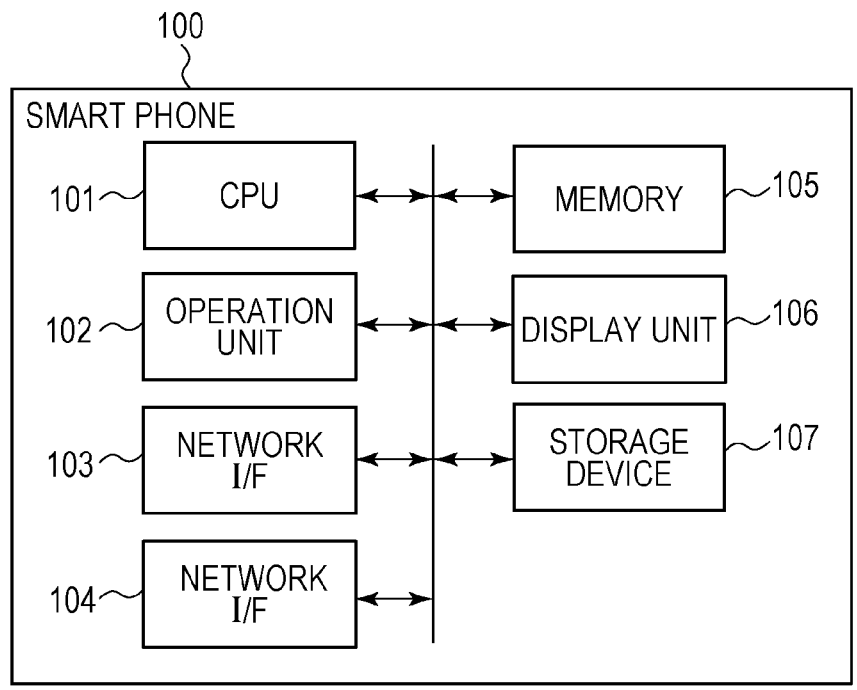
FIGS. 1A and 1B are diagrams illustrating a schematic configuration of an information processing apparatus of the present embodiment.
Figure 1B:
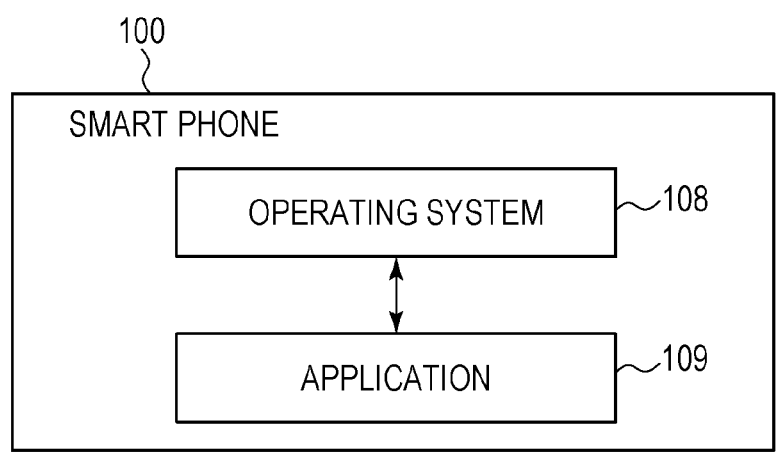

FIGS. 1A and 1B are diagrams illustrating a schematic configuration of a smart phone 100 which is the information processing apparatus of the present embodiment.

FIG. 1A illustrates a hardware configuration of the smart phone 100. The smart phone 100 includes a CPU 101, an operation unit 102, a network I/F 103, a network I/F 104, a memory 105, a display unit 106, and a storage device 107, which are connected to one another through a system bus.

The CPU 101 is a system control unit and is a processor controlling the whole smart phone 100.

The operation unit 102 is an operation unit for a user to give instructions to the smart phone 100, and is formed of, for example, buttons, a touch panel, and the like.

The memory 105 is a random access memory (RAM) as a work area for the CPU 101 and is formed of a memory such as a static RAM (SRAM). The memory 105 is used, for example, to store program control variables, various kinds of setting data, management data for the smart phone 100, and the like, and is used as a temporary storage area for various kinds of received data.

The display unit 106, which is formed of, for example, light emitting diodes (LEDs), a liquid crystal display (LCD), or the like, displays predetermined screens based on instructions from the CPU 101.

The storage device 107, which is formed of, for example, a flash memory, stores various programs executed by the CPU 101, such as control programs, application programs, the operating system (OS), and the like. In the present embodiment, the control program stored in the storage device 107 performs software control such as scheduling, task switching, and the like under the management of an embedded OS stored in the storage device 107.

The network I/F 103 and the network I/F 104 are interfaces utilized by the smart phone 100 for communication using different communication lines. In the present embodiment, the network I/F 103 is an I/F for the smart phone 100 to perform communication through connection to the Internet, by using a mobile communication line of a 3G or 4G system, for example. For example, the smart phone 100 establishes connection to the Internet using a mobile communication line by setting an APN (access point name, i.e., connection destination), a password, and the like. The network I/F 104 is an I/F for communication through connection to an external apparatus by using a communication line of a wireless LAN, such as Wi-Fi (registered trademark). For example, the smart phone 100 establishes connection to the Internet using a communication line of a wireless LAN by detecting an access point corresponding to an external apparatus and by performing connection setting, such as input of a password. Note that, in the present embodiment, the number of network I/Fs provided in the smart phone 100 is not limited to two. The smart phone 100 needs only to include at least an I/F that enables communication using a communication line that can be connected to the Internet, and an I/F that enables communication using a communication line that can be connected to an external apparatus. The number of I/Fs may be one if communication using a communication line that can be connected to the Internet and communication using a communication line that can be connected to an external apparatus can be realized by a single I/F. Further, the communication lines utilized for the I/Fs are not limited to those described above, and may instead be another communication line based on, for example, Bluetooth (registered trademark), or may be a communication line based on a wired communication method rather than a wireless communication method. In addition, the smart phone 100 need not be directly connected to the Internet or an external apparatus by using a corresponding I/F, and may be connected to them through an apparatus like a router or the like.

FIG. 1B is a diagram illustrating the software configuration of the smart phone 100. The smart phone 100 includes an operating system (OS) 108 and an application 109. The OS 108 is a program that controls the whole smart phone 100. In the present embodiment, the OS 108 supports a multi-network function (function of establishing connections using a plurality of communication lines in parallel (concurrently)). In the case where the smart phone 100 has established connections using a plurality of communication lines in parallel, the OS 108 determines a communication line to be used by the smart phone 100 on the basis of priority levels set in advance by a program. Note that in the present embodiment, the OS 108 has a function of determining whether or not a communication line whose connection has been established, is connected to the Internet. In the case where the smart phone 100 has established connections using a plurality of communication lines in parallel, the OS 108 makes the smart phone 100 preferentially use a communication line connected to the Internet. In the present embodiment, the mobile communication line is a communication line for communication through a connection to the Internet. Hence, when a connection to the mobile communication line and a connection to a wireless LAN communication line have been established in parallel, the OS 108 makes the smart phone 100 preferentially use the mobile communication line. Further, upon receipt of an instruction from the application 109, the OS 108 can perform establishing/releasing of a connection in each communication line, switching of a connection destination apparatus, setting of a communication line to be used by the smart phone 100, and the like.

The application 109 is an application program for making the smart phone 100 perform various functions. In the present embodiment, the application 109 has a function of controlling communication between an external apparatus such as a printer and the smart phone 100, and causing the external apparatus such as a printer to print an image represented by image data stored in the smart phone 100. Note that the application 109 is installed in the smart phone 100 through the Internet, for example.

The software described above, which has been stored in a memory such as the storage device 107, is developed in the memory 105 and executed by the CPU 101. Hence, in the description of the present embodiment, processing performed by the OS 108 or the application 109 is actually realized as a result of the CPU 101 executing programs corresponding to the OS 108 or the application 109.

FIG. 3 to FIG. 6 are diagrams each illustrating an example of a display screen displayed on the display unit 106.

Figure 3:
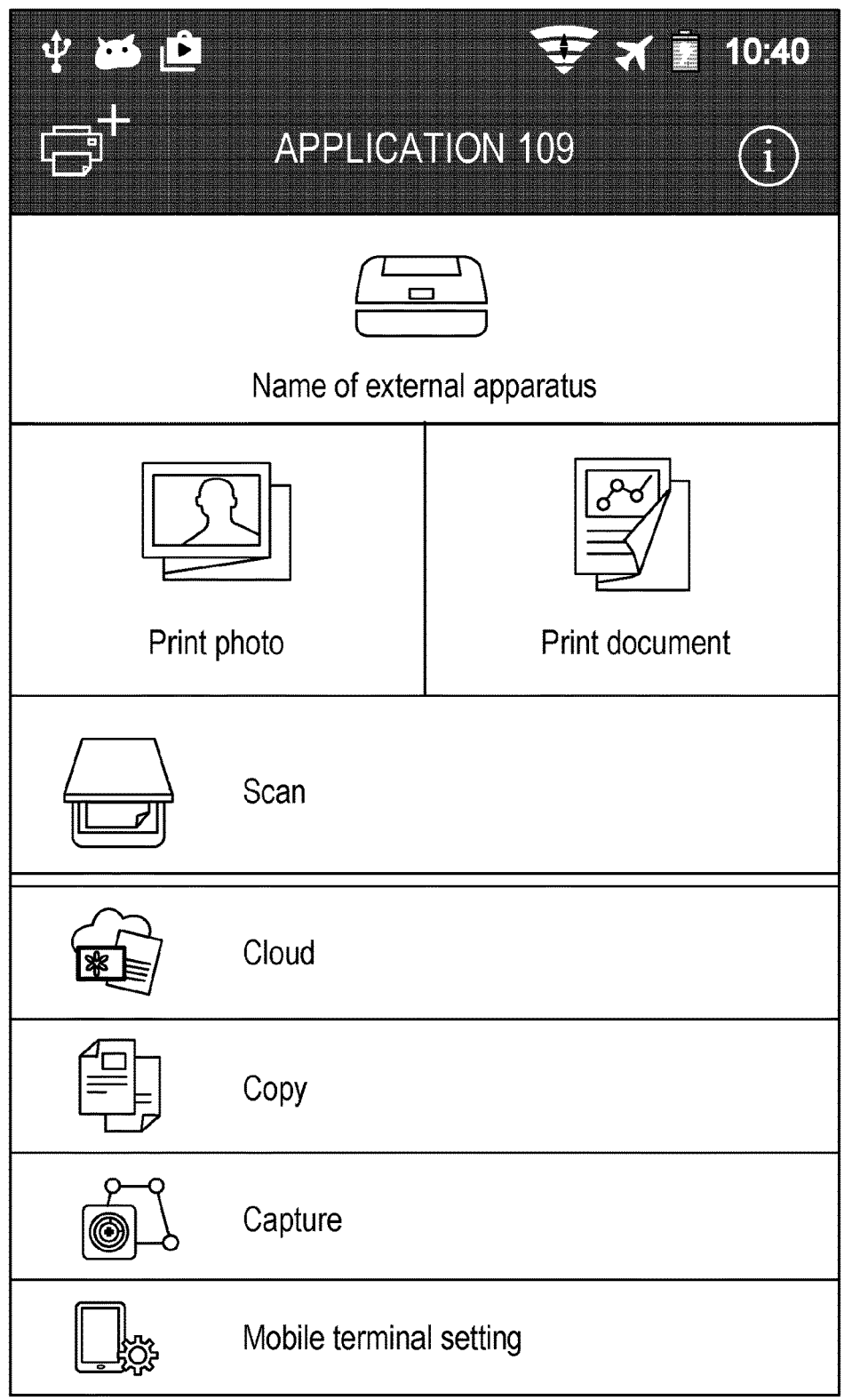
FIG. 3 is an example of a screen for making a user select a function to be performed by an application of the present embodiment.

FIG. 3 is an example of a screen for making a user select a function to be executed by the application 109. The display unit 106 displays, in displaying the screen of FIG. 3, a plurality of objects corresponding to functions that can be performed by the application 109. For example, the "Print photo" and "Print document" objects are objects for causing an external apparatus to perform printing processing, the "Scan" object is an object for causing the external apparatus to perform scan processing.

The "Cloud" object is an object for making the smart phone 100 obtain content from a server in the cloud and transmit the obtained content to an external apparatus, thereby making the external apparatus print the content in the Internet. In the "External apparatus name" portion, the name of the external apparatus to which the smart phone 100 is connected is displayed.

Note that in displaying the screen of FIG. 3, the application 109 may display objects corresponding to functions other than the functions described above. For example, the application 109 may display objects corresponding to functions of performing various settings of the external apparatus and the smart phone 100, functions for confirming the state of the external apparatus, and functions of using a Web UI installed in the external apparatus.

Figure 4:
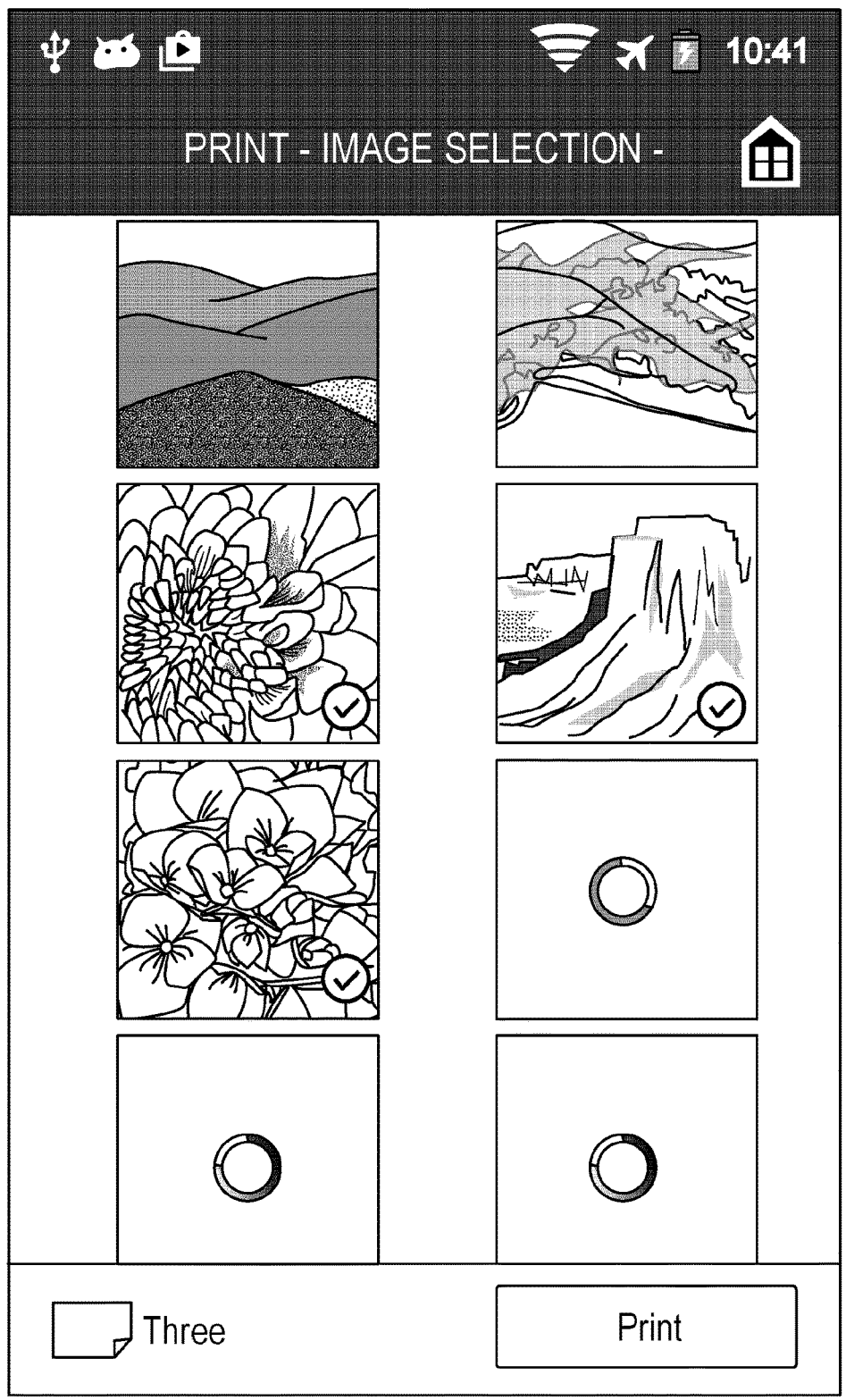
FIG. 4 is an example of a screen for making a user select an image to be printed by an external apparatus of the present embodiment.

FIG. 4 is an example of a screen for making a user select an image to be printed by an external apparatus. For example, the screen illustrated in FIG. 4 is displayed when the user has selected the "Print photo" or "Cloud" object displayed on the screen of FIG. 3. These images may be images locally stored in the smart phone 100 or images obtained through the Internet. The user can select image data to be used for printing by tapping the displayed image.

Figure 5:
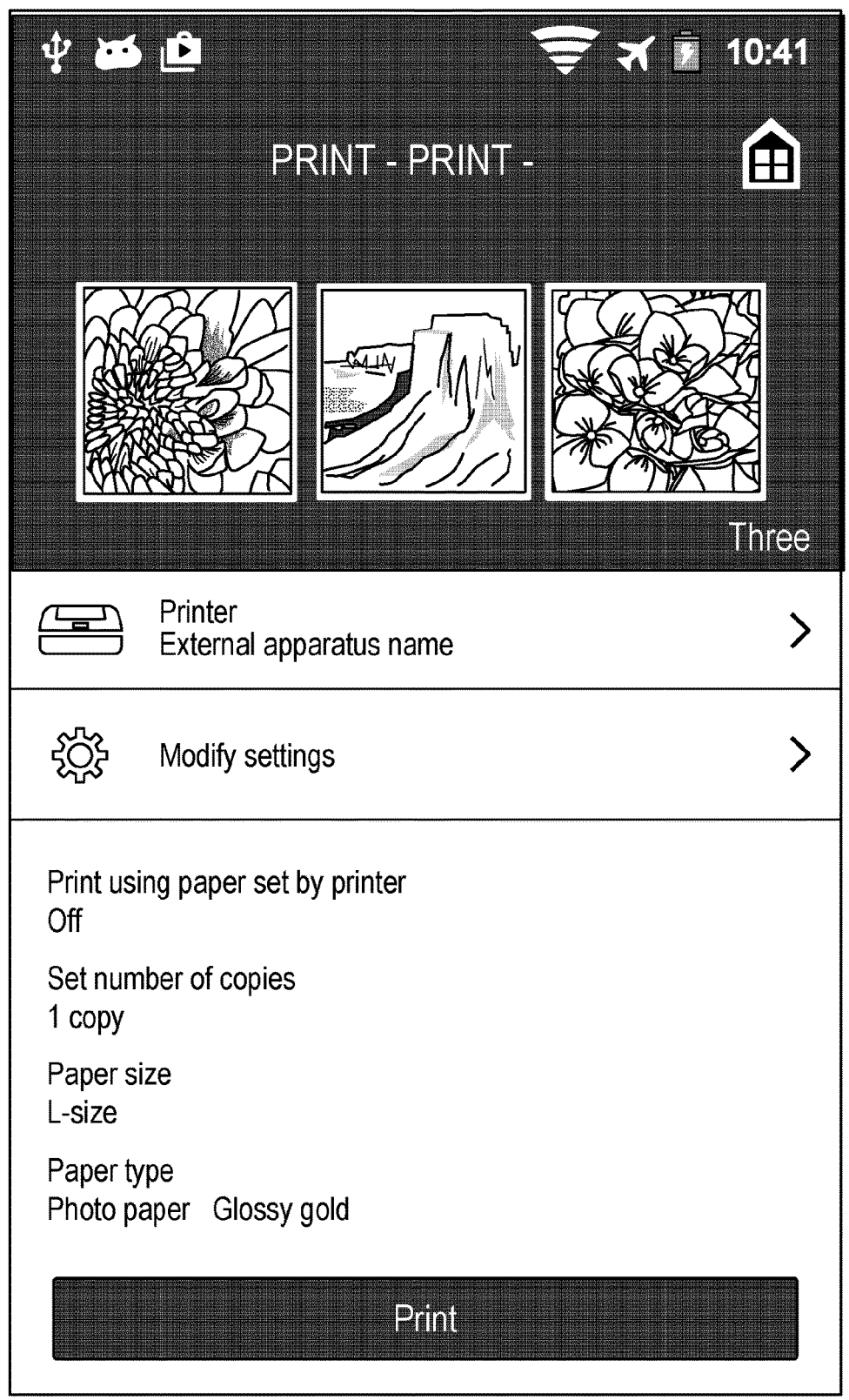
FIG. 5 is an example of a screen for making the external apparatus print the image selected by the user.

FIG. 5 is an example of a screen for making the external apparatus print the image selected by the user. The display unit 106 displays, in displaying the screen of FIG. 5, a plurality of objects corresponding to the data of the images to be printed by the external apparatus and an object ("Print" button in the figure) used to make a decision to cause the external apparatus to perform printing. The user, by tapping the "Print" button, can cause the external apparatus to print the image represented by the selected image data.

Figure 6:
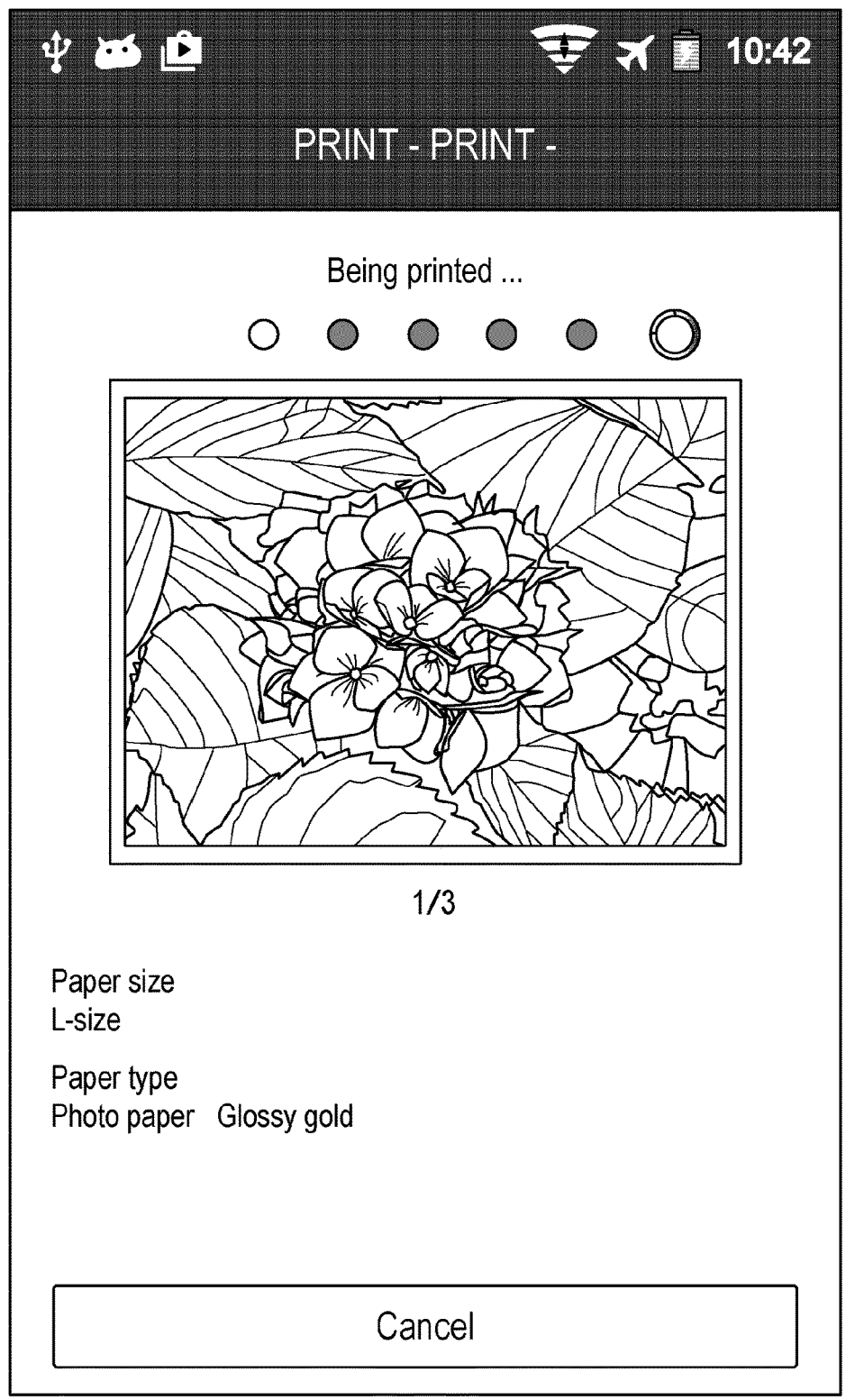
FIG. 6 is an example of a screen displayed in the case where the external apparatus of the present embodiment is being made to perform printing.

FIG. 6 is an example of a screen displayed in the case where an external apparatus is being made to perform printing. The display unit 106 displays, in displaying the screen of FIG. 6, setting information, statuses, and the like regarding printing performed by the external apparatus.

Figure 7:
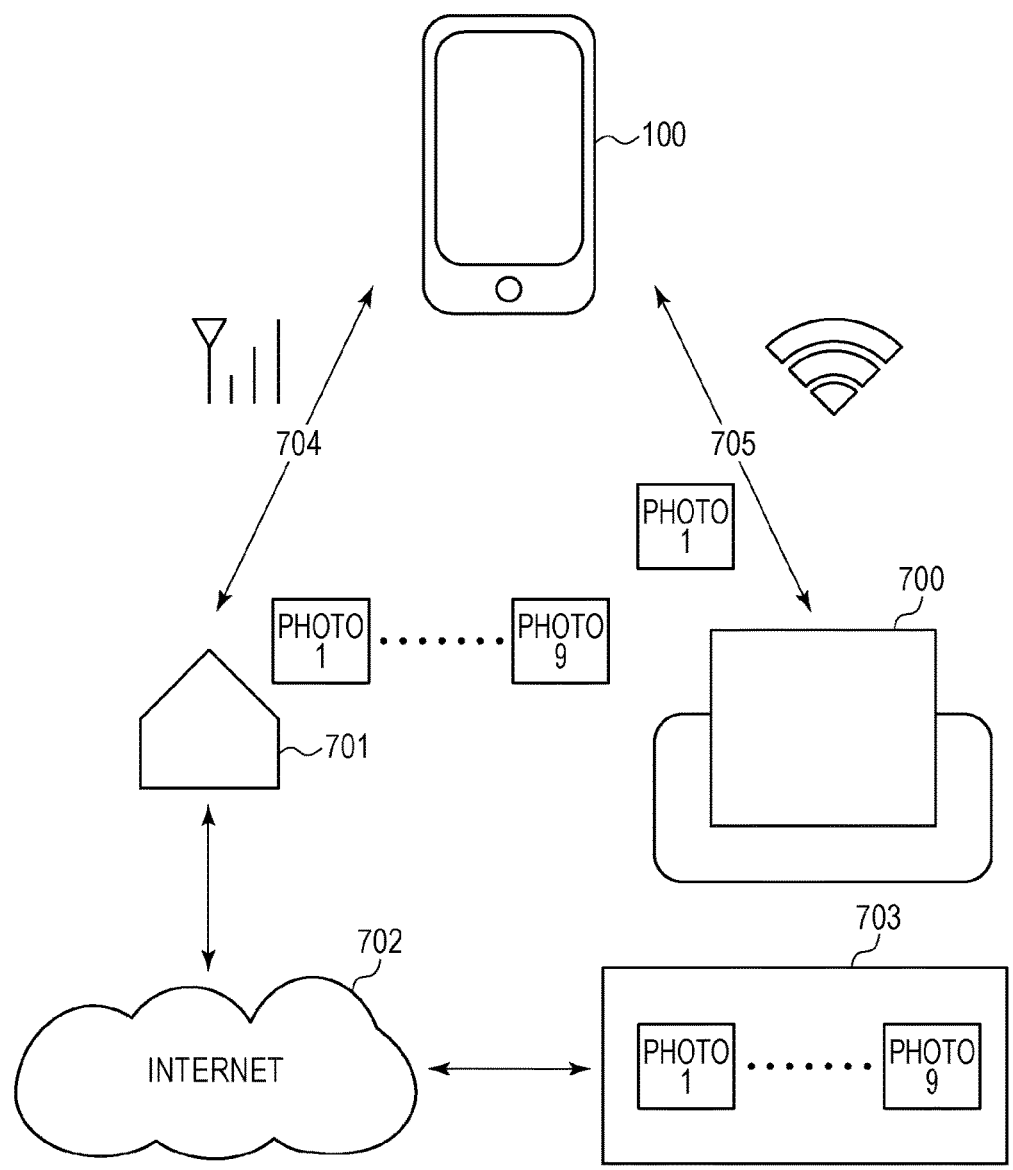
FIG. 7 is a diagram illustrating a communication system of the present embodiment.

FIG. 7 is a diagram illustrating the communication system of the present embodiment. An MFP 700, which is the external apparatus of the present embodiment, includes a function of communicating with the smart phone 100, a function of printing an image represented by image data received from the smart phone 100, and the like. Referring to FIG. 7, the smart phone 100 can establish a connection to the Internet 702 through a base station 701 by using a communication line 704. Note that, in the present embodiment, the communication line 704 corresponds to a 3G or 4G mobile communication line, for example. Further, the smart phone 100 can establish a connection to the MFP 700 by utilizing a communication line 705. Note that the communication line 705 corresponds to a communication line based on a wireless LAN such as Wi-Fi (registered trademark) in the present embodiment.

In a state in which connections are established in parallel by using two or more communication lines, the smart phone 100 is in a state of being capable of communication using a communication line specified by the OS 108, among the communication lines with established connections. Note that in the present embodiment, when connections using the communication line 704 and the communication line 705 have been established in parallel as described above, the OS 108 makes the smart phone 100 preferentially utilize the communication line 704. Note that although, in the present embodiment, the smart phone 100, regarding connection to the MFP 700 using the communication line 705, is connected directly to the MFP 700 without passing through an external access point such as a router or a base station, the smart phone 100 may be connected through an external access point. Note that, at this time, if the external access point is connected to the Internet 702, the smart phone 100 can be connected to the Internet 702 even in a state of performing communication through the communication line 705. Hence, in that state, the application 109 need not perform the processing described below.

Figure 2:
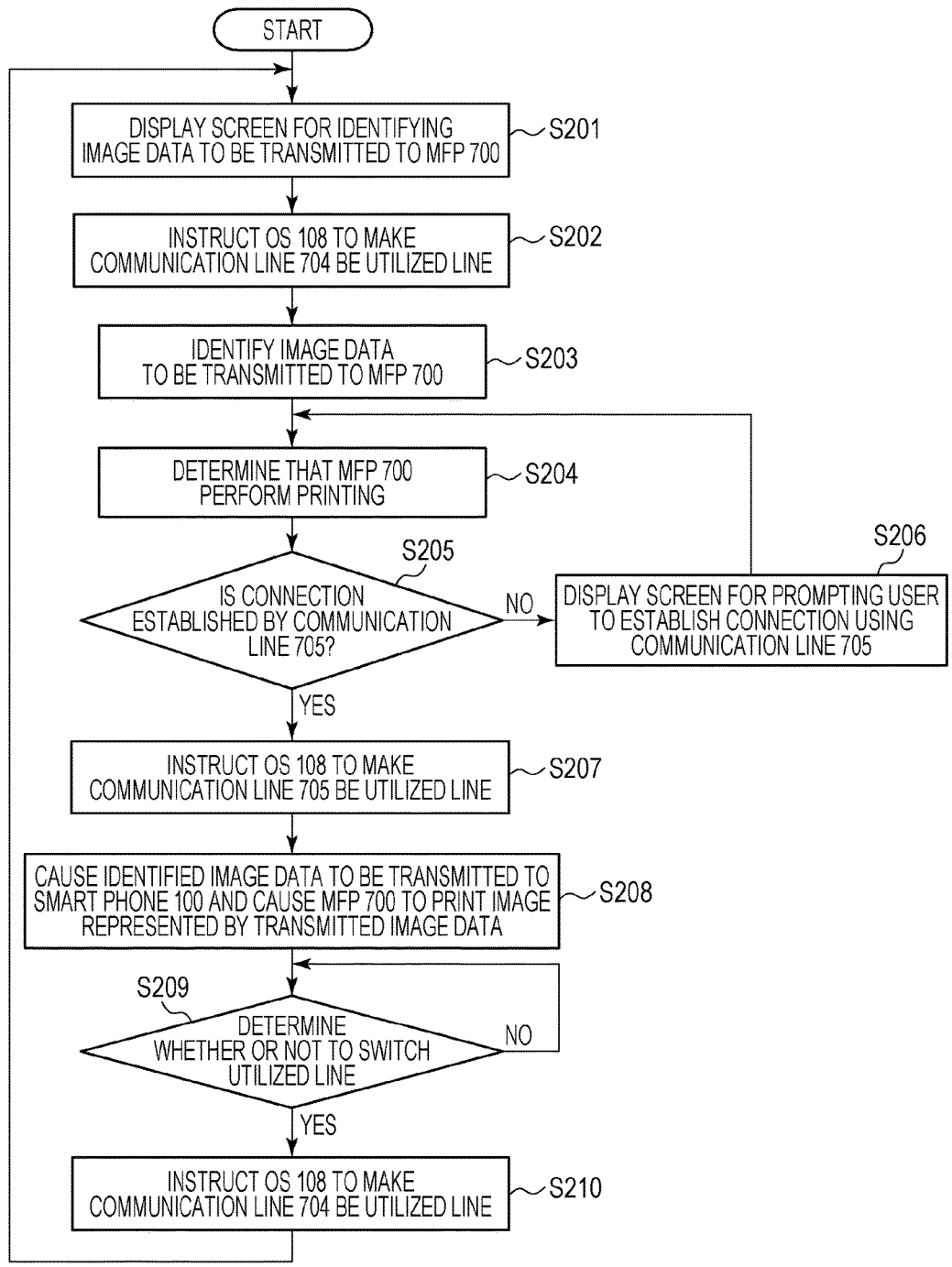
FIG. 2 is a flowchart illustrating processing performed by an application of the present embodiment.

FIG. 2 is a flowchart illustrating the processing performed by the application 109 in the present embodiment, for switching a communication line (hereinafter, called a utilized line) made to be utilized by the smart phone 100. Note that it is assumed that the processing illustrated by the flowchart is realized as a result of the CPU 101 loading into the memory 105 a control program stored in the application 109 or an HDD (not illustrated) or the like provided in the smart phone 100, and executing the control program. Further, it is assumed that the processing illustrated by the flowchart is started when the application 109 is activated in accordance with a publicly known activation sequence.

First, the application 109 displays a display screen for identifying image data to be transmitted to the MFP 700 on the display unit 106 (step S201). Here, it is assumed that the application 109 displays the display screen illustrated in FIG. 4. Note that at the timing at which the display screen illustrated in FIG. 4 is displayed may be a timing at which the application 109 is activated or a timing at which the display screen illustrated in FIG. 4 is called by a user operation in a state in which the application 109 is operating. Note that an example of identified data is image data in the present embodiment, but not limited to the image data, the identified data may be document data or commands and the like for making the MFP 700 perform predetermined processing. Further, in the case where data transmitted to an apparatus provided with a function other than a printing function is identified, any data may be allowed as far as the data can be processed by the apparatus. Note that the identified data need not be data which is stored in the smart phone 100 itself, and may be stored, for example, in a cloud server 703 and the like with which the smart phone 100 can communicate through the Internet 702. However, in that case, the smart phone 100 needs to be utilizing a communication line that can be connected to the Internet 702, to obtain data from the cloud server 703. Further, the smart phone 100 needs to be utilizing a communication line that can be connected to the Internet 702 in the case of displaying an online manual regarding the application 109 or the MFP 700 or in the case of rendering image data through the cloud server 703. For that purpose, in the present embodiment, the application 109 instructs the OS 108 to make the communication line 704 be a utilized communication line (step S202). At this time, the CPU 101 specifically executes a program of the OS 108 regarding determination of a utilized line by using values obtained by executing a program of the application 109.

The OS 108, upon receipt of an instruction, switches a utilized line to the communication line 704, thereby making the smart phone 100 enter a state in which communication is performed using the communication line 704. As a result of employing an approach like this, the application 109 can allow the smart phone 100 to utilize information in the Internet 702 at a timing at which communication with the MFP 700 is not needed. Note that the application 109 need not perform the processing of step S202 in the case where the OS 108 has already made the utilized line be the communication line 704.

Then, the application 109 identifies image data to be used for printing performed by the MFP 700 (step S203). At this time, specifically, the application 109 identifies image data to be transmitted to the MFP 700 by receiving a selection of image data from the user through the display screen of FIG. 4. Note that the identified number of pieces of image data need not be one. For example, when a selection of a plurality of pieces of image data is received from the user, a plurality of pieces of image data may be identified. Further, when the application 109 identified image data stored in the outside of the smart phone 100, for example, in the cloud server 703 or the like, the application 109 obtains the identified image data through, for example, communication with the Internet 702.

After that, the application 109, upon receipt of a data transmission instruction, determines that the MFP 700 perform printing by using the image data identified in step S203 (step S204). At this time, specifically, after detecting that an operation on an object for causing the MFP 700 to perform printing is performed through the display screen of FIG. 5, the application 109 determines that the MFP 700 perform printing. Note that, not limited to this approach, the application 109 may determine that the MFP 700 perform printing when the smart phone 100 is moved into a predetermined range with the MFP 700 as the center. Note that in order for the application 109 to cause the MFP 700 to perform printing, the image data needs to be transmitted from the smart phone 100 to the MFP 700. Hence, the application 109 determines whether or not a connection between the smart phone 100 and the MFP 700 using the communication line 705 has been established (step S205). When it is determined that the connection has not been established, the application 109 displays a screen prompting the user to establish a connection between the smart phone 100 and the MFP 700 using the communication line 705 (step S206). In this manner, the smart phone 100 detects that the user operations for detection of the SSID of the MFP 700, input of a password, and the like have been performed and can obtain connection setting information, and can establish a connection to the MFP 700. Note that the application 109, after displaying a screen prompting the user to establish a connection, detects again that an operation on an object for causing the MFP 700 to perform printing is performed, and performs again the processing of step S204. Further, for example, there may be a case where the smart phone 100 has stored the connection setting information in the memory 105 or the like because the smart phone 100 has previously detected an operation performed by the user. In this case, the application 109 may perform the processing of step S207 without performing the processing of step S206, by instructing the OS 108 to establish a connection to the MFP 700 using the communication line 705, by utilizing the connection setting information which has been stored.

In step S205, when it is determined that a connection between the smart phone 100 and the MFP 700 using the communication line 705 has been established, the smart phone 100 has established connections using the communication line 704 and the communication line 705 in parallel. However, at this time, as described above, a state has been entered in which the communication line 704 is to be utilized in accordance with the instruction from the OS 108. The communication line 704 is not a communication line that can communicate with the MFP 700 and, hence, the smart phone 100 cannot transmit image data to the MFP 700 in this state. Therefore, in the present embodiment, the application 109 instructs the OS 108 to make the communication line 705 be a utilized line (step S207). The OS 108, upon receipt of the instruction, switches the utilized line to the communication line 705 and causes the smart phone 100 to enter a state in which communication is performed by utilizing the communication line 705. At this time, the connection using the communication line 704 continues without being cut. Hence, the smart phone 100 need not perform processing for establishing a connection even in the case where the communication line 704 is used again as a utilized line, for example, to identify again the image data to be transmitted. After that, the application 109 causes the smart phone 100 to transmit the image data identified in step S203 to the MFP 700, thereby causing the MFP 700 to perform printing (step S208). Note that, at this time, the application 109 may cause the smart phone 100 to transmit not only the image data but also other information such as, for example, print setting information.

After that, the application 109 determines whether or not the utilized line is to be switched (step S209). At this time, specifically, the application 109 obtains from the MFP 700 information about the status of the processing of a job, and determines whether or not printing is finished by the MFP 700. When it is determined that printing has not been finished, it is determined that the utilized line is not to be switched, and when it is determined that printing has finished, it is determined that the utilized line is to be switched. This is because the smart phone 100 needs to maintain a state enabling communication with the MFP 700 to obtain information about printing statuses, such as a status change in time, with or without an error, and the like. Note that in step S209, the application 109 may determine whether or not the transmission of image data has been finished. In that case, when it is determined that the transmission of image data has not been finished, the application 109 determines that the utilized line is not to be switched, and when it is determined that the transmission of image data has been finished, the application 109 determines that the utilized line is to be switched. Even when the transmission of image data has been finished or printing performed by the MFP 700 has been finished, the application 109 may determine that the utilized line is not to be finished when communication with the MFP 700 needs to be continued. The cases where communication with the MFP 700 is continuously needed include a case where the status information of the MFP 700 needs to be continuously obtained, and a case where transferring of image data (image data that can be obtained without the Internet 702) within the smart phone 100 is continued.

The application 109, when determining in step S209 that the utilized line is not to be switched, repeats the processing of step S209 until it determines that the utilized line is to be switched. On the other hand, the application 109, when determining that the utilized line is to be switched, instructs the OS 108 to make the communication line 704 be a utilized line (step S210). The OS 108, upon receipt of the instruction, switches the utilized line, and makes the smart phone 100 enter a state in which communication is performed by utilizing the communication line 704. At this time, the smart phone 100, since the utilized line has been switched without cutting a connection to the communication line 704 in step S207, need not perform processing for establishing a connection in step S210. Further, at this time, since a connection using the communication line 705 continues without being cut, the smart phone 100 need not perform processing for establishing a connection even when the utilized line is made to be the communication line 705 again, for example, when the job is transmitted again. After that, the application 109 repeats the processing described above until the operation of the application terminates.

As has been described above, in the present embodiment, the smart phone 100 switches a utilized line in such a manner as to utilize a communication line which is suitable for the case where the Internet communication is necessary or the case where communication with the MFP 700 is necessary. With this configuration, the smart phone 100 can utilize an appropriate communication line in accordance with the situation.

Further, in the present embodiment, the smart phone 100, when data needs to be transmitted to the MFP 700, switches a utilized communication line without cutting an established connection. As a result, the smart phone 100 need not perform processing for storing and resetting connection setting information every time the utilized communication line is switched and, hence, compared with a configuration in which a communication destination is switched by establishing and cutting a connection, time for switching of a communication destination can be reduced.

Example methods of switching a utilized communication line without cutting an established connection include a method of switching between valid and invalid data communication settings of the smart phone 100. However, this method needs a configuration in which the smart phone 100 displays a screen for switching between valid and invalid mobile data communication settings provided by the OS and receives an input form a user through the screen. In the present embodiment, in a situation in which a utilized communication is to be switched, the application 109 automatically switches the utilized line by instructing the OS 108. Hence, in the present embodiment, the communication line utilized by the smart phone 100 can be switched without making the user perform mobile data communication setting (without displaying a screen for switching between valid and invalid mobile data communication settings).

Second Embodiment

In the embodiment described above, a configuration was described in which the smart phone 100 establishes connections using the communication line 704 and the communication line 705 in parallel, and the utilized line is switched in accordance with situations. However, the smart phone 100 may not support a multi-network function, depending on the type of installed OS, for example, and there is a case in which the connections using the communication line 704 and the communication line 705 cannot be established in parallel. Hence, in the present embodiment a configuration will be described in which processing is switched in consideration of the type of OS. Note that the basic configuration of the present embodiment is similar to that of the first embodiment and, hence, only configurations specific to the present embodiment will be described.

FIG. 8 is a flowchart illustrating the processing performed by the application 109 in the present embodiment. Note that it is assumed that the processing illustrated by the flowchart is realized as a result of the CPU 101 loading into the memory 105 a control program stored in the storage device 107 or, for example, an HDD (not illustrated) provided in the smart phone 100, and executing the control program. Further, it is assumed that the processing illustrated by the flowchart is started when the application 109 is activated by the application 109 in accordance with a publicly known activation sequence.

The processing illustrated in steps S801 to S810 is similar to the processing illustrated in steps S201 to S210 and, hence, the description thereof is omitted.

First, in step S811, the application 109 determines whether or not the OS 108 supports the multi-network function in the smart phone 100. Specifically, at this time, the application 109 recognizes versions that support the multi-network function and identifies the version of the OS 108. When it is determined that the multi-network function is supported, the application 109 performs the processing illustrated in steps S801 to S810. When it is determined that the multi-network function is not supported, the application 109 performs the processing illustrated in steps S812 to S817.

First, in step S812, the application 109 displays a display screen for identifying image data to be transmitted to the MFP 700 on the display unit 106, similarly to step S201. At this time, when connection using the communication line 704 has been established, the application 109 can display content in the Internet. After that, since the smart phone 100 cannot perform the multi-network function, the application 109 identifies image data to be used for printing performed by the MFP 700 without performing the processing of step S802 (step S813). Then the application 109 determines that the MFP 700 print an image represented by the identified image data, similarly to the processing of step S804 (step S814).

After that, similarly to the processing of step S805, the application 109 determines whether or not connection between the smart phone 100 and the MFP 700 using the communication line 705 has been established (step S815). When it is determined that the connection has not been established, the application 109, similarly to the processing of step S806, displays a screen for prompting the user to establish connection between the smart phone 100 and the MFP 700 using the communication line 705 (step S816). In this manner, the smart phone 100 detects that operations for detection of the SSID of the MFP 700, input of a password, and the like have been performed by the user and can obtain connection setting information and can establish a connection to the MFP 700 using the communication line 705. Note that, at this time, since the smart phone 100 cannot perform a multi-network function, the smart phone 100 cuts a connection using the communication line 704. Further, the application 109, after displaying a screen prompting the user to establish a connection, detects again an operation on the object for causing the MFP 700 to perform printing, and performs again the processing of step S814. Further, for example, there may be a case where the smart phone 100 has stored the connection setting information in the memory 105 or the like because the smart phone 100 has previously detected an operation performed by the user. In this case, the application 109 may perform the processing of step S817 without performing the processing of step S816, by instructing the OS 108 to establish a connection to the MFP 700 using the communication line 705, by utilizing the connection setting information which has been stored.

When a connection between the smart phone 100 and the MFP 700 using the communication line 705 has been established, the application 109 identifies image data to be used for printing performed by the MFP 700, and causes the MFP 700 to print an image represented by the image data (step S817). At this time, since the smart phone 100 cannot establish multiple connections, the application 109 does not perform processing which is performed in step S807. After that, the application 109 repeats the processing described above until the operation of the application terminates.

By employing the approach described above, the application 109 can perform processing in accordance with the type of OS installed in the smart phone 100.

Other Embodiments

In the embodiments described above, the example has been described in which a job for causing an external apparatus to perform print processing is transmitted to the external apparatus, as an example of data communication processing with an external apparatus, but the present disclosure is not limited to this. In other words, in the present disclosure, for example, a command may be transmitted to cause scan processing to be performed for reading a document set in an external apparatus. Further, the present disclosure can be similarly applied at the time of execution of data communication for performing setting of an external apparatus, data communication for obtaining the state of an external apparatus, processing for transferring predetermined data to an external apparatus, and the like.

In the embodiments described above, a configuration was employed in which switching of a utilized line is performed at the start and end of data communication; however, the present disclosure is not limited to this configuration. For example, in the case where the application 109 does not utilize the content in the cloud server 703, the smart phone 100 need not be connected to the Internet 702 in a state in which the application 109 is operating. Hence, a configuration may be employed in which a utilized line is switched in the case where the application 109 has been activated or the operation thereof has terminated. Further, the application 109 need only switch the utilized line at least one timing among the timing of the start of data communication, the timing of the end of the data communication, the timing at which the application 109 has been activated, and the timing at which the operation of the application 109 has terminated. For example, in the configuration in which the utilized line is switched at the four timings described above, even in the case where the communication line 705 is made to be a utilized line after activation and the communication line 704 is made to be a utilized line at the time when data communication has terminated, the communication line 705 can again be made to be a utilized line at the time of starting data communication. Further, for example, there may be a case in which there are a screen in which content in the cloud server 703 is utilized and a screen in which content in the cloud server 703 is not utilized, as screens for selecting data to be transmitted. In this case, the application 109 may switch the utilized line in accordance with the start and end of a screen for utilizing the content in the cloud server 703.

In the embodiments described above, the application 109 which is an application program performs the control of the present disclosure. However, for example, the OS may perform the control of the present disclosure. In other words, the OS may identify the start of data communication, the end of data communication, and the timings of activation of the application 109 and the end of the operation of the application 109, and switch a utilized line.

As far as the effects of the embodiments described above can be realized, the sequence of processing steps of the flowchart of the embodiments described above may be changed, it is not necessary to perform all of the processing steps, and the content of the processing steps may be modified. For example, the application 109 may perform the processing of step S202 when the application 109 has been activated, i.e., before the processing of step S201.

The embodiments described above can also be realized by processing obtained by providing a program that realizes one or more functions of the embodiments described above to a system or an apparatus via a network or a storage medium and as a result of one or more processors in a computer of the system or the apparatus executing the program. Further, the embodiments described above can be realized by a circuit (for example, an ASIC) realizing one or more functions.

According to the present disclosure, switching of a communication destination can be realized while reducing the load of processing pertaining to cutting and establishment of a connection.

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2015-214961, filed Oct. 30, 2015, which is hereby incorporated by reference herein in its entirety.

What is claimed is:

1. A control method for an information processing apparatus comprising:

displaying, on a display unit, a screen for receiving, from a user, an operation for selection of data that is acquired via first communication with the Internet based on a first communication method and is to be transmitted to an external apparatus in a state that the information processing apparatus is operating in a first state in which a first connection with the Internet based on the first communication method and a second connection with the external apparatus based on a second communication method are established in parallel and in which the first communication with the Internet based on the first communication method is possible and second communication with the external apparatus based on the second communication method is not possible;

receiving a transmission instruction for transmitting the data selected on a basis of the operation received via the screen in the state that the information processing apparatus is operating in the first state to the external apparatus;

switching, in accordance with receipt of the transmission instruction, the state of the information processing apparatus from the first state to a second state in which the first connection and the second connection are established in parallel and in which the second communication is possible and the first communication is not possible, the switching being performed while the information processing apparatus maintains the first connection and the second connection in parallel; and transmitting, to the external apparatus, if the state of the information processing apparatus switches from the first state to the second state, the data selected on the basis of the operation received in the state that the information processing apparatus is operating in the first state and acquired via the first communication with the Internet based on the first communication method.

2. The control method according to claim 1, further comprising:
switching, in accordance with activation of a predetermined program that operates in the information processing apparatus, the state of the information processing apparatus from the second state to the first state, while the information processing apparatus maintains the first connection and the second connection in parallel.

3. The control method according to claim 1, further comprising:
identifying that processing based on data transmitted by the second communication method has terminated, and
switching the state of the information processing apparatus from the second state to the first state, in accordance with termination of processing based on the data transmitted by the second communication method, while the information processing apparatus maintains the first connection and the second connection in parallel.

4. The control method according claim 1, further comprising:
identifying that an operation of a predetermined program that operates in the information processing apparatus terminates; and
switching the state of the information processing apparatus from the second state to the first state in accordance with termination of the operation of the predetermined program, while the information processing apparatus maintains the first connection and the second connection in parallel.

5. The control method according to claim 1, further comprising:
switching the state of the information processing apparatus from the second state to the first state in accordance with the screen having been displayed on the display unit while the information processing apparatus maintains the first connection and the second connection in parallel.

6. The control method according to claim 1, wherein the second communication method is Wi-Fi (registered trademark) communication, and the first communication method is mobile communication.

7. The control method according to claim 1, wherein the second connection with the external apparatus is direct connection performed by the second communication method without passing through an access point in an outside of the external apparatus or an outside of the information processing apparatus.

8. The control method according to claim 1, further comprising:
switching, in accordance with transmission of the data selected on the basis of the operation received in the state that the information processing apparatus is operating in the first state to the external apparatus, the state of the information processing apparatus from the second state to the first state while the information processing apparatus maintains the first connection and the second connection in parallel.

9. The control method according to claim 1, wherein, in a case where the data selected on the basis of the operation received in the state that the information processing apparatus is operating in the first state is transmitted to the external apparatus, printing based on the data selected on the basis of the operation received in the state that the information processing apparatus is operating in the first state is performed by the external apparatus.

10. A control method for an information processing apparatus comprising:
causing, in a state that a screen is displayed on a display unit of the information processing apparatus by a predetermined application program for performing data communication with an external apparatus, the information processing apparatus to operate in a first state in which a first connection with the Internet based on a first communication method and a second connection with the external apparatus based on a second communication method are established in parallel and in which first communication with the Internet based on the first communication method is possible and second communication with the external apparatus based on the second communication method is not possible;
displaying, on the display unit, a selecting screen for receiving, from a user, an operation for selection of data that is acquired via first communication with the Internet based on a first communication method and is to be transmitted to an external apparatus in a state that the information processing apparatus is operating in the first state;
switching, in the state that the screen is displayed on the display unit by the predetermined application program, the state of the information processing apparatus from the first state to a second state in which the first connection and the second connection are established in parallel and in which the second communication is possible and the first communication is not possible, the switching being performed while the information processing apparatus maintains the first connection and the second connection in parallel;
transmitting, to the external apparatus, the data selected on the basis of the operation in the state that the screen is displayed on the display unit by the predetermined application program and in a state that the information processing apparatus is operating in the second state; and
switching, after completion of the data transmission to the external apparatus, the state of the information processing apparatus from the second state to the first state while the information processing apparatus maintains the first connection and the second connection in parallel.

11. The control method according to claim 10, further comprising:
switching, in accordance with activation of the predetermined program, the state of the information processing apparatus from the second state to the first state while the information processing apparatus maintains the first connection and the second connection in parallel.

12. The control method according to claim 10, wherein, upon termination of processing based on the transmitted data by the external apparatus, the state of the information processing apparatus is switched from the second state to the first state while the information processing apparatus maintains the first connection and the second connection in parallel.

13. The control method according to claim 10, wherein, upon termination of operation the predetermined program, the state of the information processing apparatus is switched from the second state to the first state while the information processing apparatus maintains the first connection and the second connection in parallel.

14. The control method according to claim 10, wherein, upon termination of the data transmission to the external apparatus, the state of the information processing apparatus is switched from the second state to the first state while the information processing apparatus maintains the first connection and the second connection in parallel.

15. The control method according to claim 10, further comprising:
switching, based on displaying the selecting screen on the display unit, the state of the information processing apparatus from the second state to the first state while the information processing apparatus maintains the first connection and the second connection in parallel.

16. The control method according to claim 10, further comprising:
receiving a transmission instruction for transmitting data to the external apparatus;
wherein, based on receiving the transmission instruction, the state of the information processing apparatus is switched from the first state to the second state while the information processing apparatus maintains the first connection and the second connection in parallel.

17. The control method according to claim 10, wherein, after completion of the data transmission to the external apparatus, in the state that the screen displayed on the display unit by the predetermined application program, the state of the information processing apparatus is switched from the second state to the first state while the information processing apparatus maintains the first connection and the second connection in parallel.

18. The control method according to claim 10, wherein the second communication method is Wi-Fi (registered trademark) communication, and the first communication method is mobile communication.

19. The control method according to claim 10, wherein the second connection with the external apparatus is direct connection performed by the second communication method without passing through an access point in an outside of the external apparatus or an outside of the information processing apparatus.

20. The control method according to claim 10, wherein, in a case where the data selected on the basis of the operation is transmitted to the external apparatus via the data communication with the external apparatus, printing based on the data selected on the basis of the operation is performed by the external apparatus.

* * * * *